United States Patent Office 3,325,456
Patented June 13, 1967

3,325,456
PROCESS FOR THE PREPARATION OF POLYMERS
Stephen Adamek, Islington, Ontario, and Bertie B. J. Wood, Oakville, Ontario, Canada, assignors to Dunlop Rubber Company Limited, London, England, a British company
No Drawing. Filed June 10, 1965, Ser. No. 463,016
Claims priority, application Great Britain, June 30, 1964, 26,903/64
19 Claims. (Cl. 260—79.7)

This invention relates to a process for the preparation of polymers and particularly to a process for the preparation of polymers of one or more vicinal episulphides.

According to the present invention a process for the preparation of a polymer comprises polymerizing one or more vicinal episulphides in the presence of a polymerization catalyst being a compound of a metal of the B sub Group of Group II of the Mendeléeff Periodic Table, and a cocatalyst as hereinafter defined.

The cocatalysts which are used in the process of the present invention are ammonia, inorganic ammonium compounds, organic amines, hydrazines and derivatives of hydrazine. Examples of suitable inorganic ammonium compounds are ammonium hydroxide, ammonium sulphide and ammonium carbonate. Organic amines which can be used include primary aliphatic amines such as methylamine, ethylamine and allylamine, and diamines such as ethylene diamine, propylene diamine and 1,6-hexane diamine. An example of a derivative of hydrazine is phenylhydrazine.

The polymerization catalyst which is used in conjunction with the cocatalyst to effect polymerization of the vicinal episulphide or episulphides is a compound of a metal of Group II-B of the Mendeléeff Periodic Table. Examples of compounds which may be used are the alkyls, sulphides, halides and oxides of zinc, cadmium and mercury. Particularly useful catalysts are zinc carbonate and cadmium carbonate. The amount of the catalyst used can vary over a wide range depending on the particular catalyst used but will usually be from 0.5 percent to 10 percent by weight based on the vicinal episulphide or episulphides to be polymerized.

The amount of the cocatalyst that is used in conjunction with the polymerization catalyst can vary over a wide range depending on the desired molecular weight of the polymer. Usually the amount will be such that the molar ratio of the cocatalyst to the catalyst is from 1:1 to 100:1. However, if a high molecular weight polymer is to be prepared, then the molar ratio of cocatalyst:catalyst will usually be from 1:1 to 10:1, preferably from 2:1 to 4:1. The molecular weight of the polymer produced depends on the amount of the cocatalyst used, for instance, using a particular catalyst/cocatalyst system increasing the amount of the cocatalyst results in a decrease in the molecular weight of the polymer obtained. Thus, by using a large molar ratio of cocatalyst to catalyst, polymers of low molecular weight, e.g. as low as 350, can be obtained, and by adjusting the amount of cocatalyst used, polymers of any desired molecular weight can be obtained. To obtain a polymer having a molecular weight in the range of 350 to 10,000, the molar ratio of cocatalyst:catalyst should be at least 10:1, and is preferably from 15:1 to 100:1, depending upon the desired molecular weight.

It is believed that the characterizing feature of the cocatalysts is that they contain at least one nitrogen atom which may form a complex with the catalyst. The molar ratios of cocatalyst:catalyst stated above apply to a cocatalyst containing only one nitrogen atom, and if the cocatalyst contains more than one nitrogen atom, then the cocatalyst:catalyst ratio must be varied accordingly. However, this molar ratio will depend on the cocatalyst used, varying with the strength of the complex formed between the catalyst and cocatalyst and need not be the same for different cocatalysts to produce a polymer of a particular molecular weight.

The polymerization catalyst and the cocatalyst can be mixed prior to addition of the episulphides to be polymerized or they can be mixed in situ in the presence of the vicinal episulphide, for instance the cocatalyst can be added either with the vicinal episulphide or subsequent to the vicinal episulphide.

The polymerization reaction can be effected in a number of different ways. If desired, the polymerization reaction can be effected in the absence of a solvent for the monomers and/or the resultant polymer, or the polymerization reaction can be effected in an organic solvent for the monomers by a solution polymerization technique. When the polymerization reaction is effected in a solvent for the monomers then the solvent should be chemically inert to the monomers and to the other ingredients of the reaction mixture, and can be a hydrocarbon such as hexane or benzene. Other solvents which may be used are organic ethers such as diethyl ether.

Preferably, the polymerization reaction is effected by an emulsion polymerization technique. The liquid used to form the emulsion should be chemically inert to all the ingredients and is preferably a polar compound. Examples of suitable inert liquids are aliphatic organic alcohols, e.g. methyl alcohol and isopropyl alcohol, dimethylformamide and water.

The temperature at which the polymerization reaction is effected can vary over a wide range depending on the particular episulphide to be polymerized and the nature of the reaction medium, but will usually be from 0° C. up to the boiling point of the reaction medium. The polymerization reaction can conveniently be carried out at room temperature.

The process of the present invention can be used to prepare polymers and interpolymers from a wide variety of episulphides. Examples of episulphides which may be used are alkylene episulphides, e.g. ethylene episulphide, propylene episulphide and butylene episulphide, alicyclic episulphides such as cyclohexene episulphides, unsaturated episulphides, e.g. allyloxypropyl episulphide, butadiene monoepisulphide and 1–5 hexadiene monoepisulphide, and aromatic episulphides, e.g., styrene episulphide. Episulphides containing more than one episulphide group, e.g. 1–5 hexadiene diepisulphide can also be polymerized. Derivatives of episulphides, for instance halogen-substituted episulphides can be polymerized. Interpolymers of two or more episulphides can be formed, but if ethylene episulphide is incorporated into an interpolymer then the proportion of ethylene episulphide is preferably not greater than 35 percent by weight based on the interpolymer.

The polymers produced by the process of the present invention can be cured by heating them in the presence of a curing agent. The curing agents which may be used to effect curing or vulcanization of the polymers of the invention are the oxides and peroxides of the metals of the B sub groups of Groups I to IV and the A sub group of Group V of the Mendeléeff Periodic Table, inorganic oxidizing agents such as zinc chromate, lead chromate, potassium chromate and ammonium chromate, and quinoid compounds such as quinone and p-quinone dioxime.

The temperature at which curing of the polymers is effected is preferably above the softening point of the polymer, but below the temperature at which degradation of the polymer occurs. The temperature, depending upon the particular polymer, is usually from 250° F. to 500° F., preferably from 250° F. to 350° F.

The amount of the curing agent used may vary over a wide range depending on the particular agent, but when a metal oxide is used the amount will usually be from 5 parts to 25 parts and preferably from 5 to 15 parts by weight per 100 parts of the polymer.

Reinforcing fillers such as carbon black, silica and clay, and other ingredients such as antioxidants and plasticizers can be compounded with the polymers of the invention.

The polymers produced in accordance with the method of the present invention have at least two terminal reactive groups, at least one of which groups is a thiol group. The other group or groups will depend on the cocatalyst used, and may be for instance another thiol group, a hydroxy group, or usually an amino group. For example, if ammonium hydroxide is used as the cocatalyst, said other reactive group will be an amine group.

The invention is illustrated by the following examples, in which all parts are parts by weight.

*Example I*

This example illustrates the polymerization of propylene episulphide using a Group II–B metal compound as catalyst in the presence of ammonium hydroxide as cocatalyst, and the vulcanization of the resulting polymers.

1 gramme of zinc carbonate and 0.1 ml. of ammonium hydroxide (containing 30 percent of available ammonia) were added together with 22 mls. of propylene episulphide to 40 mls. of water in a clean reaction vessel. The mixture was stirred and the polymerization reaction was allowed to proceed for 16 hours during which time the reaction mixture was stirred continuously. After 16 hours the polymer was separated by filtration, dried and weighed. The intrinsic viscosity of the polymer in thiophene at 35° C. was measured. The above procedure was repeated 10 times using the amounts of reactants shown in Table I below. In each experiment, 40 mls. of water and 22 mls. of propylene episulphide were employed. In Table I, Conv. indicates the percentage conversion of propylene episulphide to polypropylene episulphide, and I.V. represents the intrinsic viscosity of the polymer in thiophene at 35° C., and the amounts of Group II–B metal compounds are in grammes.

| Expt. No. | NH₄OH (mls.) | ZnCO₃ | ZnO | CdCO₃ | Conv. | I.V. |
|---|---|---|---|---|---|---|
| 1 | 0.1 | 1 | | | 92 | 0.20 |
| 2 | 0.5 | 1 | | | 92 | 0.22 |
| 3 | 1.0 | 1 | | | 92 | 0.21 |
| 4 | 2.0 | 1 | | | 95 | 0.15 |
| 5 | 5.0 | 1 | | | 92 | 0.10 |
| 6 | 0.2 | | 1 | | 92 | 0.19 |
| 7 | 1.0 | | 1 | | 98 | 0.22 |
| 8 | 5.0 | | 1 | | 92 | 0.15 |
| 9 | 0.5 | | | 1 | 90 | 0.21 |
| 10 | 5.0 | | | 1 | 92 | 0.11 |
| 11 | 5.0 | | | 1 | 92 | 0.11 |

For purposes of comparison, polypropylene episulphide was prepared from propylene episulphide using a Group II–B metal compound by the above procedure, but in the absence of a cocatalyst. The amounts used (grammes) of the Group II–B metal compounds are given in Table I–A.

TABLE I–A

| Expt. No. | ZnCO₃ | ZnO | CdCO₃ | Conv. | I.V. |
|---|---|---|---|---|---|
| 12 | 1 | | | 95 | 0.01 |
| 13 | | 1 | | 92 | 0.01 |
| 14 | | | 1 | 95 | 0.72 |

The polymer produced in each of experiments 1 to 14 was mixed with 50 parts of carbon black (HAF carbon black) and 10 parts of zinc peroxide per 100 parts of the polymer. The mixture was heated to a temperature of 307° F. and the time required for maximum cure to be reached was measured. The physcal properties of the resulting vulcanizate, if any, were noted, and the results are shown in Table I–B in which the maximum cure time is given in minutes.

TABLE I–B

| Expt. No. | Maximum Cure Time (min.) | Properties |
|---|---|---|
| 1 | 2½ | Poor recovery. |
| 2 | 10 | Fair recovery. |
| 3 | 20 | Snappy. |
| 4 | 50 | Snappy, tight. |
| 5 | 50 | Brittle. |
| 6 | 4 | Poor recovery. |
| 7 | 30 | Snappy, tight. |
| 8 | 50 | Brittle. |
| 9 | 12 | Fair recovery. |
| 10 | 50 | Snappy, tight. |
| 11 | 60 | Brittle. |
| 12 | | No cure. |
| 13 | | Do. |
| 14 | | Do. |

These results show that a curable polymer is produced using a Group II–B metal compound in the presence of ammonium hydroxide, but an uncurable polymer is produced using a Group II–B metal compound alone.

*Example II*

This example illustrates the types of vulcanizing agents that may be used to cure a copolymer of propylene episulphide and ethylene episulphide prepared by the method of the invention.

20 grammes of zinc carbonate and 20 mls. of ammonium hydroxide (30 percent available ammonia) were added, together with 440 mls. of propylene episulphide and 55 mls. of ethylene episulphide to 800 mls. of water in a clean reaction vessel. The mixture was allowed to react for 16 hours during which time the mixture was stirred continuously. The percentage conversion of episulphide monomers was 96, and the resulting polymer, a low tack, tough, rubbery solid, had an intrinsic viscosity in thiophene at 35° C. of 0.28.

100 parts of this polymer were mixed with 60 parts of SRF carbon black, 1.5 parts of stearic acid and 15 parts of zinc monoxide. The mixture was heated at 307° F. for 20 minutes to effect curing of the polymer.

The above procedure was repeated thirteen times but using the vulcanizing agents listed in Table II instead of the zinc monoxide. The cure times in minutes at 307° F. are also listed in Table II, in which GMF represents paraquinone dioxime, MBPI represents methylene bis(4-phenyl isocyanate), and Cumene Hy represents cumene hydroperoxide.

TABLE II

| Expt. No. | Vulcanizing Agent | Parts | Cure-time |
|---|---|---|---|
| 1 | ZnO | 15 | 20 |
| 2 | ZnO₂ | 10 | 20 |
| 3 | PbO | 15 | 20 |
| 4 | PbO₂ | 10 | 10 |
| 5 | Pb₃O₄ | 10 | 20 |
| 6 | As₂O₃ | 15 | 20 |
| 7 | MgO | 10 | 20 |
| 8 | MnO₂ | 10 | 30 |
| 9 | CdO | 15 | 20 |
| 10 | ZnCrO₄+GMF | 10+1.5 | 10 |
| 11 | ZnO+GMF | 0.5+1.5 | 10 |
| 12 | MBPI | 10 | 30 |
| 13 | Cumene Hy | 1 | 20 |
| 14 | Cumene Hy | 4 | 20 |

The following properties of each vulcanizate were measured and the results are shown in Table II–A:

(a) Modulus at 100 percent elongation ($M_{100}$) in pounds per square inch.
(b) Modulus at 300 percent elongation ($M_{300}$) in pounds per square inch.
(c) Tensile strength (T.S.) in pounds per square inch.
(d) Percentage elongation at break (E).
(e) Percentage set at break (S).
(f) Shore Hardness (ShoreA) (S.H.) in British Standard Degrees. Shore Hardness is expressed as $X/Y$ where X represents the initial hardness and Y represents the hardness after 10 second.

TABLE II-A

| Expt. No. | $M_{100}$ | $M_{300}$ | T.S. | E | S | S.H. |
|---|---|---|---|---|---|---|
| 1 | 360 | 960 | 1,020 | 320 | 25 | 64/60 |
| 2 | 600 | ---- | 1,440 | 230 | 0 | 68/67 |
| 3 | 480 | 1,240 | 1,320 | 320 | 15 | 67/64 |
| 4 | 400 | ---- | 1,320 | 240 | 0 | 62/60 |
| 5 | 560 | ---- | 1,160 | 230 | 20 | ---- |
| 6 | 520 | ---- | 1,500 | 210 | 5 | 65/63 |
| 7 | 640 | ---- | 1,240 | 220 | 15 | 71/68 |
| 8 | 600 | ---- | 1,200 | 180 | 5 | 70/68 |
| 9 | 520 | 1,260 | 1,260 | 300 | 35 | 72/69 |
| 10 | 720 | ---- | 1,420 | 200 | 5 | 69/67 |
| 11 | 660 | ---- | 1,320 | 190 | 5 | 70/69 |
| 12 | 880 | ---- | 1,120 | 120 | 5 | 72/70 |
| 13 | (¹) | (¹) | (¹) | (¹) | (¹) | (¹) |
| 14 | (¹) | (¹) | (¹) | (¹) | (¹) | (¹) |

¹ No cure.

The vulcanizates from experiments 1, 2, 3 and 5 were subjected to a stress relaxation test at 100° C. at an elongation of 100 percent. The result are shown in Table II–B.

TABLE II-B

| Expt. No.: | Strength retention (percentage) |
|---|---|
| 1 | 27 |
| 2 | 51 |
| 3 | 37 |
| 5 | 45 |

For comparison, a natural rubber composition containing:

| | Parts |
|---|---|
| Natural rubber | 100 |
| Zinc oxide | 50 |
| Stearic acid | 1 |
| Sulphur | 2 |
| Tetramethyl thiuram disulphide | 1 |
| Tellurium diethyl dithiocarbamate | 0.5 | was vulcanized by heating for 10 minutes at 307° F. The vulcanizate was subjected to a stress relaxation test at 100° C. at 100 percent elongation, and the strength retention was 75 percent.

*Example III*

This example illustrates the effect of zinc peroxide as the vulcanizing agent.

30 grammes of zinc carbonate and 30 mls. of ammonium hydroxide were added, together with 600 mls. of propylene episulphide to 1200 mls. of water in a clean reaction vessel. Polymerization was effected for 16 hours with continuous stirring. The percentage conversion of the propylene episulphide was 91, and the resulting polymer, a soft, tacky rubber, had an intrinsic viscosity in thiophene at 35° C. of 0.20.

Two compositions were prepared from this polymer according to the following formulae:

| | Composition A, parts | Composition B, parts |
|---|---|---|
| Polymer | 100 | 100 |
| HAF carbon black | 50 | 50 |
| Zinc peroxide | 10 | |

Each composition was heated to 307° F. for 15 minutes. The properties listed in Table III below were measured for each vulcanizate, and the results are shown in Table III.

TABLE III

| Property | Composition A | Composition B |
|---|---|---|
| 100% elongation (p.s.i.) | 400 | 112 |
| 300% elongation (p.s.i.) | 1,480 | ---- |
| Tensile strength (p.s.i.) | 1,680 | 272 |
| Percent elongation at break | 330 | 280 |
| Hardness (Shore A) | 63/61 | 44/34 |
| Percent set at break | 15 | ---- |

*Example IV*

This example illustrates the types of compound, other than amonium hydroxide which can be used as cocatalysts.

Propylene episulphide was polymerized by the procedure given in Example I using the ingredients specified in Table IV below. In each of experiments 1 to 17 22 mls. of propylene episulphide and 40 mls. of water were used and in experiment 18, the water was replaced by 40 mls. of ispropyl alcohol. In Table IV the folowing abbreviations have been used.

| | |
|---|---|
| Hy | Hydrazine. |
| Hy H | Hydrazine hydrate. |
| Hy HCl | Hydrazine hydrochloride. |
| Ally | Allylamine. |
| E.D. | Ethylene diamine. |
| E.I. | Ethylene imine. |
| A.E. | 2-amino-ethanol. |
| Ph. Hy. | Phenyl hydrazine. |
| D.E.T. | Diethylene triamine. |
| H.D. | 1–6 hexane diamine. |
| MeA (aq) | A 30 percent solution in water of methylamine. |
| DEPA | Diethylaminopropylamine. |
| MePA | 3-methoxy propylamine. |
| IBP | 3,3 iminobis-propylamine. |
| G | Glycine. |

TABLE IV

| Expt. No. | Cocatalyst | $ZnCO_3$ (g.) | Percent Conv. | I.V. |
|---|---|---|---|---|
| 1 | 1 ml. Hy H | 1 | 95 | 0.13 |
| 2 | 1 ml. Hy | 1 | 92 | 0.14 |
| 3 | 1 g. Hy HCl | 1 | 90 | 0.02 |
| 4 | 0.9 ml. Ally | 1 | 100 | 0.18 |
| 5 | 0.3 ml. E.D | 1 | 99 | 0.25 |
| 6 | 0.5 ml. E.I | 1 | 88 | 0.12 |
| 7 | 0.5 ml. A.E | 1 | 92 | 0.17 |
| 8 | 1 ml. Ph. Hy | 1 | 35 | |
| 9 | 1 ml. D.E.T | 1 | 100 | 0.02 |
| 10 | 1 g. H.D | 1 | 100 | 0.02 |
| 11 | 1.5 ml. MeA (aq.) | 1 | 100 | 0.17 |
| 12 | 0.3 ml. Hyd. A | 1 | 92 | 0.14 |
| 13 | 1 ml. DEPA | 1 | 100 | 0.04 |
| 14 | 0.5 g. MePA | 1 | 98 | 0.17 |
| 15 | 1 g. IBP | 1 | 92 | |
| 16 | 4 g. G+2 g. NaOH | 1 | 95 | |
| 17 | 2 g. $(NH_4)_2CO_3$ | 1 | 90 | |
| 18 | 1 ml. $(NH_4)_2S_x$ | 1 | 28 | |

100 parts of each polymer were mixed with 50 parts of HAF carbon black and 10 parts of zinc peroxide. Each composition was heated to 307° F. for the period of time shown in Table IV–B. The cure-time shown is the time required to reach the maximum state of cure.

TABLE IV-B

| Expt. No. | Cure-time (min.) | Properties |
|---|---|---|
| 1 | 15 | Snappy but porous. |
| 2 | 15 | Good recovery. |
| 3 | 20 | Fair tensile and recovery. |
| 4 | 10 | Poor recovery. |
| 5 | 15 | Snappy, tight cure. |
| 6 | 20 | Do. |
| 7 | 15 | Snappy. |
| 8 | 15 | Poor recovery. |
| 9 | 40 | Hard, low elongation. |
| 10 | 40 | Do. |
| 11 | 20 | Tight, low elongation. |
| 12 | 20 | Snappy, tight cure. |
| 13 | 25 | Poor recovery. |
| 14 | 15 | Tight, low elongation. |
| 15 | 20 | Fair tensile, hard. |
| 16 | 20 | Do. |
| 17 | 25 | Snappy, tight cure. |
| 18 | 20 | Good recovery. |

*Example V*

This example describes the preparation of polymers comprising at least one episulphide.

Polymers and copolymers of episulphides were prepared by the procedure given in Example I using the ingredients shown in Table V below, in which EtS represents ethylene episulphide, PrS represents propylene episulphide, BuS represents butylene episulphide and AOPrS represents allyoxypropyl episulphide.

TABLE V

| Expt. No. | Water (mls.) | NH₄OH (mls.) | ZnCO₃ (g.) | CdCO₃ (g.) |
|---|---|---|---|---|
| 1 | 400 | 20 | 20 | |
| 2 | 80 | 2 | 2 | |
| 3 | 80 | 2 | 2 | |
| 4 | 80 | 2 | 2 | |
| 5 | 50 | 1 | | 2 |
| 6 | 80 | 2 | 2 | |
| 7 | 100 | 1 | | 2 |
| 8 | 100 | 1 | | 2 |

| Expt. No. | EtS (mls.) | PrS (mls.) | BuS (mls.) | AOPrS (mls.) | Percent Conv. | I.V. |
|---|---|---|---|---|---|---|
| 1 | 28 | 220 | | | 90 | 0.14 |
| 2 | 4 | 44 | | | 91 | 0.16 |
| 3 | | 11 | 44 | | 82 | 0.16 |
| 4 | | 11 | 33 | | 88 | |
| 5 | | | | 25 20 | 98 | |
| 6 | | 22 | | | 92 | 0.19 |
| 7 | | 25 | | 25 | 100 | |
| 8 | | | | 50 | 100 | |

The polymer from each experiment was mixed with 50 parts per hundred of zinc peroxide and the mixture was heated at 307° F. At maximum cure, the vulcanizates had good tensile strength and good recovery properties.

*Example VI*

This example illustrates the use of a solvent in the polymerization reaction.

Polymers were prepared from propylene episulphide by the procedure outlined in Example I except that the water was replaced by 40 mls. of a solvent for the monomers, and cadmium carbonate was used as the Group II-B metal compound. 22 mls. of propylene episulphide and 40 mls. of solvent were used in each experiment. The different solvents used and the amounts of the various ingredients are shown in Table VI, in which the following abbreviations have been used:

MeOH _____ Methyl alcohol.
IPE _____ Isopropyl alcohol.
IPA _____ Diisopropyl ether.
THF _____ Tetrahydrofuran.

TABLE VI

| Expt. No. | Solvent | NH₄OH | CdCO₃ | Percent Conv. | I.V. |
|---|---|---|---|---|---|
| 1 | Water | 1 | 1 | 92 | 0.20 |
| 2 | MeOH | 1 | 1 | 90 | 0.23 |
| 3 | IPA | 1 | 1 | 45 | 0.29 |
| 4 | IPE | 1 | 1 | 88 | 0.23 |
| 5 | THF | 1 | 1 | 92 | 0.21 |
| 6 | Benzene | 1 | 1 | 50 | 0.15 |
| 7 | Benzene | 5 | 1 | 88 | 0.12 |

The polymers were mixed with 50 parts per hundred of HAF carbon black and 10 parts per hundred of zinc peroxide. The mixtures were vulcanized at 307° F. to give vulcanizates having a good recovery characteristics.

*Example VII*

This example illustrates the preparation of polypropylene episulphide using zinc oxide as the catalyst and ammonium hydroxide as the cocatalyst. The effect on the molecular weight of the polymer of increasing the mole ratio of cocatalyst:catalyst is shown.

Into a clean reaction vessel were charged 40 mls. of diethyl ether, and 1 gramme of zinc oxide. The mixture was agitated and 22 grammes of propylene episulphide were added. The resulting polymerization reaction was allowed to proceed for 16 hours at 23° C., after which time the diethyl ether and unreacted propylene episulphide were removed by evaporation under reduced pressure. The percentage conversion of propylene episulphide, and the molecular weight of the polymer were determined. The molecular weight was determined by vapour phase osmometry.

The above experiment was repeated nine times except that ammonium hydroxide was added with the 1 gramme of zinc oxide. The amount of ammonium hydroxide added in each experiment is shown in Table VII below, in which the results are also given. In each experiment, 40 mls. of diethyl ether and 22 mls. of propylene episulphide were used.

In Table VII, PrS represents propylene episulphide, Ratio represents the molar ratio of nitrogen of the cocatalytic:catalyst, Conv. represents the percentage conversion of propylene episulphide, and M represents the molecular weight of the polymer.

TABLE VII

| Expt. No. | ZnO | NH₄OH (aq.) (mls.) | Ratio | Conv. | M |
|---|---|---|---|---|---|
| 1 | 1 | | | 8 | 3,630 |
| 2 | 1 | 0.35 | 0.5 | 10 | 20,000 |
| 3 | 1 | 1.75 | 2.5 | 75 | 17,000 |
| 4 | 1 | 3.5 | 5 | 80 | 9,500 |
| 5 | 1 | 7.0 | 10 | 100 | 5,450 |
| 6 | 1 | 14.0 | 20 | 92 | 3,630 |
| 7 | 1 | 21.0 | 30 | 100 | 2,050 |
| 8 | 1 | 28.0 | 40 | 90 | 1,550 |
| 9 | 1 | 42.0 | 60 | 92 | 1,190 |
| 10 | 1 | 70.0 | 100 | 75 | 1,140 |

The polymers of Experiments 1, 2 and 3 were rubbery solids, and the polymers of Experiments 4-10 were clear liquids.

These results show that as the molar ratio of the nitrogen of the cocatalyst-catalyst is increased, the molecular weight of the product decreases.

*Example VIII*

This example illustrates the bulk of polymerization of propylene episulphide.

Experiments 1 and 4 to 10 of Example VII were repeated except that the diethyl ether was excluded from the polymerization reaction mixture.

The results are shown in Table VIII in which the abbreviations used are the same as in Table VII.

TABLE VIII

| Expt. No. | NH4OH (aq.) (mls.) | Ratio | Conv. | M |
|---|---|---|---|---|
| 1 | | | 38 | 1 (50,000) |
| 4 | 3.5 | 5 | 100 | 8,030 |
| 5 | 7.0 | 10 | 100 | 5,300 |
| 6 | 14.0 | 20 | 100 | 2,910 |
| 7 | 21.0 | 30 | 100 | 2,140 |
| 8 | 28.0 | 40 | 100 | 1,670 |
| 9 | 42.0 | 60 | 95 | 1,370 |
| 10 | 70.0 | 100 | 100 | 1,200 |

[1] Approximately.

These results again show that increasing the molar ratio of the nitrogen of the cocatalyst:catalyst causes a decrease in the molecular weight of the polymer.

*Example IX*

This example illustrates the use of cadmium carbonate as the catalyst and hydrazine hydrate as the cocatalyst.

Into a clean reaction vessel were charged 40 mls. of water, and 1 gramme of cadmium carbonate. The mixture was agitated and 22 mls. of propylene episulphide were added. The reaction was allowed to continue for 16 hours at 23° C. and then the water and unreacted propylene episulphide were removed by evaporation under reduced pressure. This procedure was repeated seven times (Experiments 2 to 8) except that hydrazine hydrate, in the amounts shown in Table IX below, were added with the cadmium carbonate.

Four further experiments (9 to 12) were carried out according to the above procedure except that the water was excluded from the reaction mixture. The amounts of catalyst and cocatalyst used are shown in Table IX. 22 mls. of propylene episulphide were used in each experiment. The results are shown in Table IX, in which Hy H represents hydrazine hydrate (mls.).

TABLE IX

| Expt. No. | Hy H | CdCO3 (g.) | PrS (mls.) | Ratio | Conv. | M |
|---|---|---|---|---|---|---|
| 1 | | 1 | 22 | | 100 | (IV=0.81) |
| 2 | 0.6 | 1 | 22 | 5 | 100 | (IV=0.13) |
| 3 | 1.2 | 1 | 22 | 10 | 100 | 2,230 |
| 4 | 2.5 | 1 | 22 | 20 | 98 | 1,130 |
| 5 | 3.7 | 1 | 22 | 30 | 100 | 780 |
| 6 | 5.0 | 1 | 22 | 40 | 52 | 690 |
| 7 | 7.5 | 1 | 22 | 60 | 100 | 490 |
| 8 | 12.5 | 1 | 22 | 100 | 100 | 340 |
| 9 | | 1 | 22 | | 100 | (IV=0.61) |
| 10 | 1.2 | 1 | 22 | 10 | 100 | 2,780 |
| 11 | 5.0 | 1 | 22 | 40 | 72 | 560 |
| 12 | 12.5 | 1 | 22 | 100 | 48 | 415 |

*Example X*

This example illustrates the range of catalyst concentrations which may be used when the molar ratio of cocatalyst:catalyst is constant at 60:1.

The procedure outlined in Example VII was used, except that the 40 mls. of diethyl ether were replaced by 40 mls. of water. The amounts of catalyst (ZnCO3) and cocatalyst (NH4OH) used are shown in Table X. 40 mls. of water and 22 mls. of propylene episulphide were used in each experiment.

TABLE X

| Expt. No. | ZnCO3(g.) | NH4OH (aq.) (mls.) | Conv. | M |
|---|---|---|---|---|
| 1 | 2 | 84 | 98 | 1,370 |
| 2 | 1 | 42 | 98 | 1,450 |
| 3 | 0.2 | 8.4 | 90 | 1,180 |
| 4 | 0.05 | 2.1 | 50 | 955 |
| 5 | 0.01 | 0.40 | 10 | 1,250 |
| 6 | 0.002 | 0.08 | 10 | 995 |

These results show that the molecular weight of the polymer is approximately the same in each experiment. The rate of polymerization is, of course, lower at lower catalyst concentrations.

*Example XI*

This example illustrates the types of reaction medium which can be employed.

The procedure of Example X was carried out nine times except that 0.1 gramme of zinc carbonate and 2.1 mls. of ammonium hydroxide were used in each experiment, and the 40 mls. of water were replaced by 40 mls. of the solvents given in Table XI. 22 mls. of propylene episulphide were used in each experiment, and polymerization was allowed to continue for 16 hours at 23° C.

TABLE XI

| Expt. No. | Medium | Conv. | M |
|---|---|---|---|
| 1 | Pentane | 75 | 870 |
| 2 | Benzene | 35 | 710 |
| 3 | Chlorobenzene | 35 | 900 |
| 4 | Diethyl ether | 60 | 2,100 |
| 5 | Chloroform | 12 | 1,020 |
| 6 | Methanol | 75 | 1,770 |
| 7 | Dimethylformamide | 100 | 3,070 |
| 8 | Amyl acetate | 50 | 1,030 |
| 9 | Water | 100 | 1,800 |

These results show that the percentage conversion of propylene episulphide in 16 hours at 23° C. is higher in the reaction media of high dielectric constant than in the media of low dielectric constant. Also, the molecular weight of the polymer varies greatly depending on the reaction medium used.

*Example XII*

This example illustrates the effect on the molecular weight of the polymer prepared by a bulk polymerization technique of varying the reaction temperature.

The procedure outlined in Example XI was repeated six times except that the 40 mls. of reaction medium were excluded from the reaction mixture. The temperature used in each experiment is shown in Table XII. 0.1 gramme of zinc carbonate, 2.1 mls. of ammonium hydroxide and 22 mls. of propylene episulphide were used in each experiment.

TABLE XII

| Expt. No. | Temp., ° C. | Ratio | Conv. | M |
|---|---|---|---|---|
| 1 | −80 | 30 | 2 | |
| 2 | −20 | 30 | 2 | |
| 3 | 0 | 30 | 12 | 2,460 |
| 4 | 23 | 30 | 78 | 2,150 |
| 5 | 50 | 30 | 75 | 1,130 |
| 6 | 100 | 30 | 78 | 1,050 |

These results show that at temperatures substantially below zero the percentage conversion of propylene episulphide is too low to be of any value, and that by increasing the temperature from 0° C. to 100° C. results in a decrease in the molecular weight of the polymer.

*Example XIII*

This example illustrates the preparation of low molecular weight copolymers of episulphides.

The procedure given in Example VII was repeated but using the ingredients specified in Table XIII below, in which EtS represents ethylene episulphide, BuS represents butyl episulphide, AO PrS represents allyloxypropyl episulphide, and VEtS represents vinyl ethyl episulphide. In each experiment, cadmium carbonate was used as the catalyst, 25 mls. of ammonium hydroxide were used as the cocatalyst, and 25 mls. of water were used as the reaction medium.

TABLE XIII

| Expt. No. | CdCO3 (g.) | PrS | EtS | BuS | AO PrS | VEtS | Conv. | M |
|---|---|---|---|---|---|---|---|---|
| 1 | 0.5 | 25 | | —0 | | | 92 | 1,650 |
| 2 | 0.5 | 25 | 5 | | | | 90 | 1,750 |
| 3 | 1 | 25 | | | 2.5 | | 85 | 700 |
| 4 | 1 | 25 | | 5 | | | 78 | 1,200 |
| 5 | 1 | 25 | | | | 5 | 88 | 1,250 |

Having now described our invention—what we claim is:

1. A process for the preparation of a polymer which comprises polymerizing at least one vicinal episulfide in the presence of a catalyst selected from the group consisting of compounds of the metals of the B sub group of Group II of the Mendeléeff Periodic Table, and a cocatalyst selected from the group consisting of ammonia, inorganic ammonium compounds, organic amines, hydrazine, and derivatives of hydrazine.

2. A process according to claim 1 in which the amount of the catalyst is from 0.5 percent to 10 percent by weight based on the episulphide or episulphides to be polymerized.

3. A process according to claim 1 in which the amount of the cocatalyst is such that the molar ratio of the cocatalyst to the catalyst is from 1:1 to 100:1.

4. A process according to claim 3 for the preparation of a high molecular weight polymer in which the amount of the cocatalyst is such that the molar ratio of the cocatalyst to the catalyst is from 1:1 to 10:1.

5. A process according to claim 4 in which said molar ratio is from 2:1 to 4:1.

6. A process according to claim 1 in which the cocatalyst is added to the catalyst simultaneously with the addition of the episulphide or episulphides to be polymerized.

7. A process according to claim 1 in which the polymerization is effected in the presence of an organic solvent for the episulphide or episulphides to be polymerized.

8. A process according to claim 1 being an emulsion polymerization process in which the episulphide or episulphides to be polymerized are in the form of an emulsion in a liquid polar medium.

9. A process according to claim 1 in which the polymerization is effected at a temperature of from 0° C. up to the boiling point of the polymerization reaction mixture.

10. A process according to claim 7 in which said solvent is an organic hydrocarbon.

11. A process according to claim 10 in which the organic hydrocarbon is benzene.

12. A process according to claim 7 in which said solvent is an aliphatic organic ether.

13. A process according to claim 12 in which said aliphatic organic ether is diethyl ether.

14. A process according to claim 8 in which said polar medium comprises an aliphatic alcohol.

15. A process according to claim 8 in which said polar medium is water.

16. A process according to claim 1 in which said catalyst is zinc carbonate.

17. A process according to claim 1 in which said catalyst is cadmium carbonate.

18. A process according to claim 1 in which said cocatalyst is ammonium hydroxide.

19. A process according to claim 1 in which said catalyst is selected from the group consisting of carbonates and oxides of the metals of the B sub group of Group II of the Mendeléeff Periodic Table.

References Cited

UNITED STATES PATENTS 3,222,326  12/1965  Brodoway _____ 260—79.7

JOSEPH L. SCHOFER, *Primary Examiner.*

D. K. DENENBERG, *Assistant Examiner.*